United States Patent
Yoshimura (10) Patent No.: US 9,338,846 B2
(45) Date of Patent: May 10, 2016

(54) DIMMING DEVICE AND ILLUMINATION SYSTEM USING SAME

(71) Applicant: PANASONIC INTELLECTUAL PROPERTY MANAGEMENT CO., LTD., Osaka (JP)

(72) Inventor: Yuichi Yoshimura, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 14/643,378

(22) Filed: Mar. 10, 2015

(65) Prior Publication Data

US 2015/0264768 A1 Sep. 17, 2015

(30) Foreign Application Priority Data

Mar. 13, 2014 (JP) .................................. 2014-049734

(51) Int. Cl.
*H05B 33/08* (2006.01)
*H05B 37/02* (2006.01)

(52) U.S. Cl.
CPC .......... *H05B 33/0845* (2013.01); *H05B 37/029* (2013.01); *H05B 37/0254* (2013.01); *H05B 33/0803* (2013.01)

(58) Field of Classification Search
USPC .......... 315/185 S, 209 R, 224, 246, 307–326, 315/247, 291
See application file for complete search history.

(56) References Cited

U.S. PATENT DOCUMENTS

| 3,763,394 | A | * | 10/1973 | Blanchard | ............ | H05B 37/029 |
| | | | | | | 315/294 |
| 4,320,964 | A | * | 3/1982 | Ishida | ..................... | G03B 27/72 |
| | | | | | | 315/307 |
| 5,453,939 | A | * | 9/1995 | Hoffman et al. | .............. | 702/183 |
| 2011/0285310 | A1 | * | 11/2011 | Leinen | ................... | H05B 37/04 |
| | | | | | | 315/291 |

FOREIGN PATENT DOCUMENTS

| JP | 2-138897 U | 11/1990 |
| JP | 2000-12241 | 1/2000 |
| JP | 2002-329586 A | 11/2002 |
| JP | 2007-294269 | 11/2007 |
| JP | 2013-109982 | 6/2013 |
| JP | 2013-149497 | 8/2013 |
| JP | 5311636 B2 | 10/2013 |
| KR | 10-2007-0096862 A | 10/2007 |

OTHER PUBLICATIONS

Korean Office Action dated Feb. 22, 2016 issued in corresponding Korean Patent Application No. 10-2015-0034868 and English summary thereof.

* cited by examiner

*Primary Examiner* — Tuyet Vo
(74) *Attorney, Agent, or Firm* — Greenblum & Bernstein, P.L.C.

(57) ABSTRACT

A dimming device includes a control unit, a first setting section and a second setting section. The control unit is configured to receive a control signal transmitted by a multiplexing transmission method and to control a dimming level of an illumination load in response to the control signal. The illumination load includes light-emitting diodes. The first setting section is configured to set a lower limit of the dimming level of the illumination load, the lower limit being adjustable in a first range. The second setting section is configured to set an upper limit of the dimming level of the illumination load, the upper limit being adjustable in a second range. A minimum value in the second range is greater than a maximum value in the first range.

5 Claims, 5 Drawing Sheets

DIMMING DEVICE AND ILLUMINATION SYSTEM USING SAME

CROSS-REFERENCE TO RELATED APPLICATION

This application claims the benefit of priority of Japanese Patent Application No. 2014-049734, filed on Mar. 13, 2014, the entire contents of which are hereby incorporated by reference.

TECHNICAL FIELD

The present disclosure relates to a dimming device and an illumination system using the same, and more particularly to a dimming device for dimming illumination loads and an illumination system using the same.

BACKGROUND ART

Conventionally, there has been known a dimming device that controls a dimming level of a luminaire by using a time-division multiplexing transmission system (see, e.g., Japanese Unexamined Patent Application Publication No. 2000-12241). A dimming device disclosed in the above reference applies a dimming signal to a dimming signal line in the form of DC voltage ranging from 0 V to 10 V. The dimming level of the luminaire becomes the lowest when a dimming signal is 0 V, and the dimming level of the luminaire becomes the highest when a dimming signal is 10 V.

Recently, LED luminaires are widely being used. Such LED luminaires are able to emit light at lower illuminance than the fluorescent lamps. At low illuminance, however, there occur differences in brightness of lights emitted from respective LED elements. For this reason, when an LED luminaire is dimmed to a low illuminance by the dimming device disclosed in the above reference, the visual quality may become poor due to unevenness in brightness or flickering. In addition, when an LED luminaire is lighted at a high illuminance by the dimming device disclosed in the above reference, there may be dazzling or glaring due to the light-emitting characteristic of LEDs.

SUMMARY OF THE INVENTION

In view of the above, the present disclosure provides a dimming device exhibiting good visual quality throughout the entire range of the dimming level of an illumination load including LEDs, and an illumination system using the same.

In accordance with an aspect of the present invention, there is provided a dimming device including a control unit, a first setting section and a second setting section. The control unit is configured to receive a control signal transmitted by a multiplexing transmission method and to control a dimming level of an illumination load in response to the control signal. The illumination load includes light-emitting diodes. The first setting section is configured to set a lower limit of the dimming level of the illumination load, the lower limit being adjustable in a first range. The second setting section is configured to set an upper limit of the dimming level of the illumination load, the upper limit being adjustable in a second range. A minimum value in the second range is greater than a maximum value in the first range.

In accordance with another aspect of the present invention, there is provided an illumination system including the dimming device described above, the illumination load described above, and a controller. The dimming device is electrically connected to a communications line. The illumination load is configured to be controlled by the dimming device. A controller is electrically connected to the communications line, and configured to control the dimming device by transmitting the control signal to the dimming device in the multiplexing transmission method.

In the dimming device according to an embodiment of the present invention, the control unit sets the upper and lower limits of the dimming range of the illumination load, and therefore, unevenness in brightness at low illuminance can be suppressed and dazzling or glaring of LEDs at high illuminance can be less perceivable. In short, the control unit enables the illumination load including LEDs to exhibit good visual quality throughout the entire range of the dimming level.

An illumination system according to an embodiment of the present invention includes the above-described dimming device and thus can exhibit good visual quality throughout the entire range of the dimming level of the illumination load including LEDs.

BRIEF DESCRIPTION OF THE DRAWINGS

The figures depict one or more implementations in accordance with the present teaching, by way of example only, not by way of limitations. In the figures, like reference numerals refer to the same or similar elements.

DETAILED DESCRIPTION

Embodiments of an illumination system having a dimming device according to the present disclosure will be described with reference to FIGS. 1 to 6. The illumination system of the present disclosure includes dimmable illumination loads and is capable of turning on and off the illumination loads. The illumination system of the present disclosure is used in commercial facility or offices, for example. Although, in this embodiment, the illumination system having one dimming device and one operation device is shown for the sake of illustration, the illumination system may have a plurality of dimming devices and a plurality of operation devices.

In the illumination system according to the present embodiment, an illumination load can be turned on/off or a dimming level of the illumination load can be set by operating an operation device mounted on, e.g., a wall. The illumination load includes, e.g., LEDs (light emitting diodes). The number of the illumination load 10 is not limited to one but may be more than one.

Figure 4:
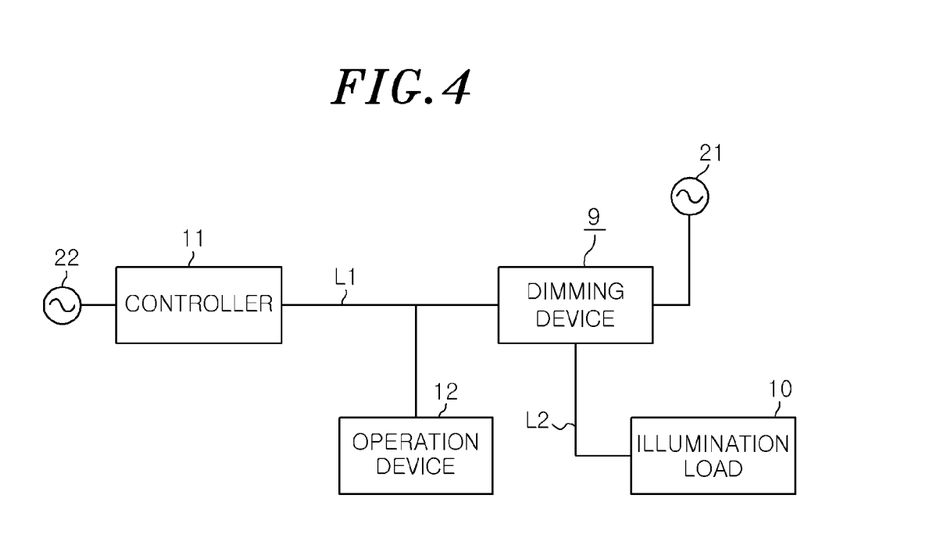
FIG. 4 is a schematic block diagram of an illumination system according to the embodiment of the present invention.

As shown in FIG. 4, the illumination system includes a controller 11 and a dimming device 9 which are connected to a two-wire communications line L1. The illumination system further includes an illumination load 10 controlled by the dimming device 9 and an operation device 12 connected to the controller 11 through the communications line L1.

The operation device 12 serves as an operation unit for turning on/off the illumination load 10 and/or for changing a dimming level of the illumination load 10. The operation device 12 includes a plurality of switches (not shown). When a switch is operated, the operation device 12 sends a multiplexed transmission signal corresponding to the operation of the switch to the controller 11.

The controller 11, the dimming device 9 and the operation device 12 are each assigned identification information (e.g., address). The controller 11 individually identifies devices connected to the communications line L1 by using the addresses. The controller 11 communicates multiplexed transmission signals between the dimming device 9 and the operation device 12.

In a memory (not shown) of the controller 11, addresses respectively assigned to the switches (not shown) of the operation device 12 and addresses of the dimming devices 9 are stored, an address of each switch being associated with an address of each dimming device 9. Upon receiving a transmission signal sent from the operation device 12, the controller 11 refers to the memory to obtain an address of a relevant dimming device 9 based on an address of a switch contained in the transmission signal, and sends a control signal to the relevant dimming device 9.

If the controller 11 sends the control signal, the relevant dimming device 9 receives the control signal and performs control over an illumination load 10 corresponding to an address contained in the control signal. That is, by operating a switch of the operation device 12, it is possible to control a lighting state of the illumination load 10 corresponding to the switch.

A power source 22 is electrically connected to the controller 11. The power source 22 supplies power to various devices electrically connected to the communications line L1, as well as the controller 11.

The dimming device 9 is electrically connected to the illumination load 10 by an electric line L2. A power source 21 is electrically connected to the dimming device 9. The dimming device 9 turns on the illumination load 10 using power supplied from the power source 21.

The dimming device 9 performs dimming control over the illumination load 10 in a power-controlled manner or in a signal-controlled manner. The power-controlled manner includes a phase control scheme based on in-phase and a phase control scheme based on anti-phase. In the phase control scheme based on anti-phase, a semiconductor switch (e.g., a FET (field effect transistor), a TRIAC or the like) (not shown) is turned on at the timing of zero crossing of AC voltage from a power source. Consequently, inrush currents introduced at the time of turning the switch on is reduced in the phase control scheme based on anti-phase, compared to the phase control scheme based on in-phase. The dimming device 9 of the present embodiment controls the illumination load 10 in the phase control scheme based on anti-phase.

Figure 1:
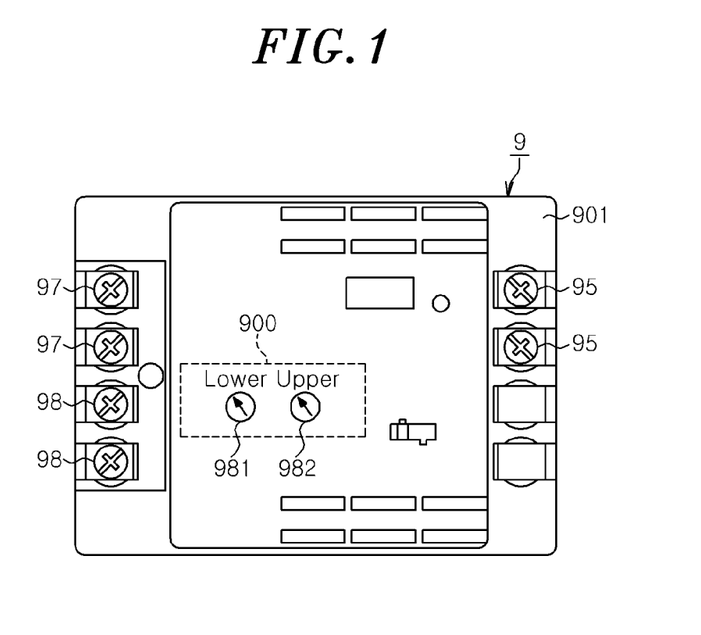
FIG. 1 is an external view of a dimming device according to an embodiment of the present invention.

As shown in FIG. 1, in the main body 901 of the dimming device 9, a pair of multiplexed-transmission-signal terminals 95 to which the communications line L1 is connected, a pair of power terminals 97 to which the power source 21 is connected, load terminals 98 to which the illumination load 10 is connected, and a setting unit 900 are provided.

The dimming device 9 turns on the illumination load 10 with power supplied from the power source 21 (e.g., commercial power supply of AC 100 V to 277 V).

Figure 2:
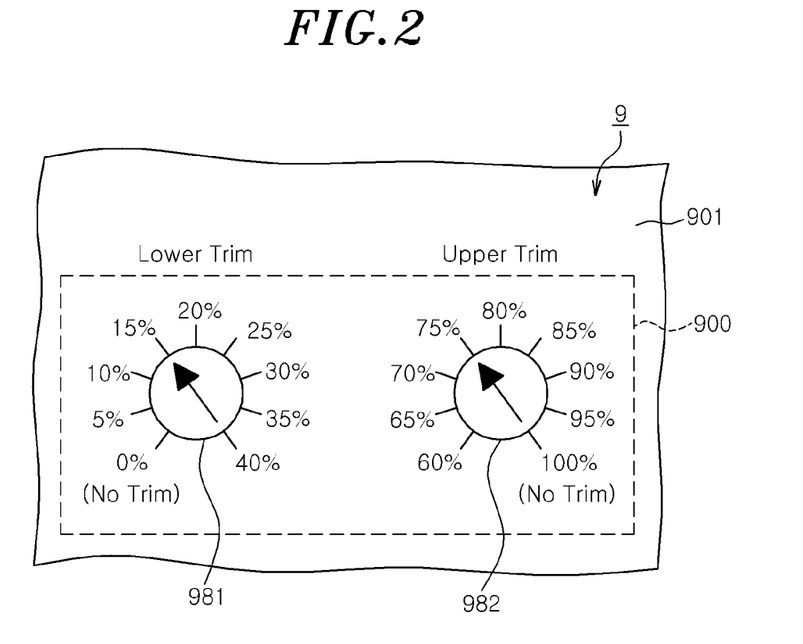
FIG. 2 is an enlarged view of a major portion of the dimming device according to the embodiment of the present invention.

As shown in FIG. 2, the setting unit 900 includes an operation section 981 for setting the lower limit of the dimming range of the illumination load 10 and an operation section 982 for setting the upper limit of the dimming range of the illumination load 10. The operation sections 981 and 982, e.g., rotary variable resistors project from the surface of the main body 901 by approximately 5 mm to 7 mm so that the operation sections 981 and 982 can be rotated manually. The operation sections 981 and 982 can be rotated in a range of approximately 0 to 300 degrees. Alternatively, a groove may be formed on the surfaces of the operation sections 981 and 982, and a tip of a tool such as a slot screw driver or a phillips screw driver may be inserted into the groove to rotate the operation sections 981 and 982. Further, the operation sections 981 and 982 are preferably exposed on the surface of the main body 901 so that they can be rotated manually. However, the operation sections 981 and 982 may not project from the surface of the main body 901.

Along the outer circumference of the operation sections 981 and 982, gradations indicating setting values are marked. By putting a target (the tip of an arrow in the present embodiment) on a desired gradation, a setting value is determined. Since the operation sections 981 and 982 may be operated with equipment such as a screw driver, as well as with hands, the setting of the dimming range can be easily performed. In addition, the operation sections 981 and 982 may employ any of, e.g., DIP switches, slide switches, input devices of a touch panel type, and wireless communication devices using infrared communication or radio wave, as long as the upper and lower limits of the dimming range can be set. Although the setting unit 900 of the present embodiment has one set of operation sections (two operation sections), the number of the set of the operation sections is not limited to one and may be determined appropriately depending on the number of a dimming unit 3 (see FIG. 3).

The operation section 981 (a first setting section) shown in FIG. 2 sets the lower limit of the dimming range of the illumination load 10 connected to the load terminals 98. The operation section 982 (a second setting section) shown in FIG. 2 sets the upper limit of the dimming range of the illumination load 10 connected to the load terminals 98. The numerical values (%) of the gradations marked on the periphery of the operation sections 981 and 982 indicate dimming levels in percentage, wherein a dimming level is 100% when the illumination load 10 illuminates at its full intensity.

Figure 3:
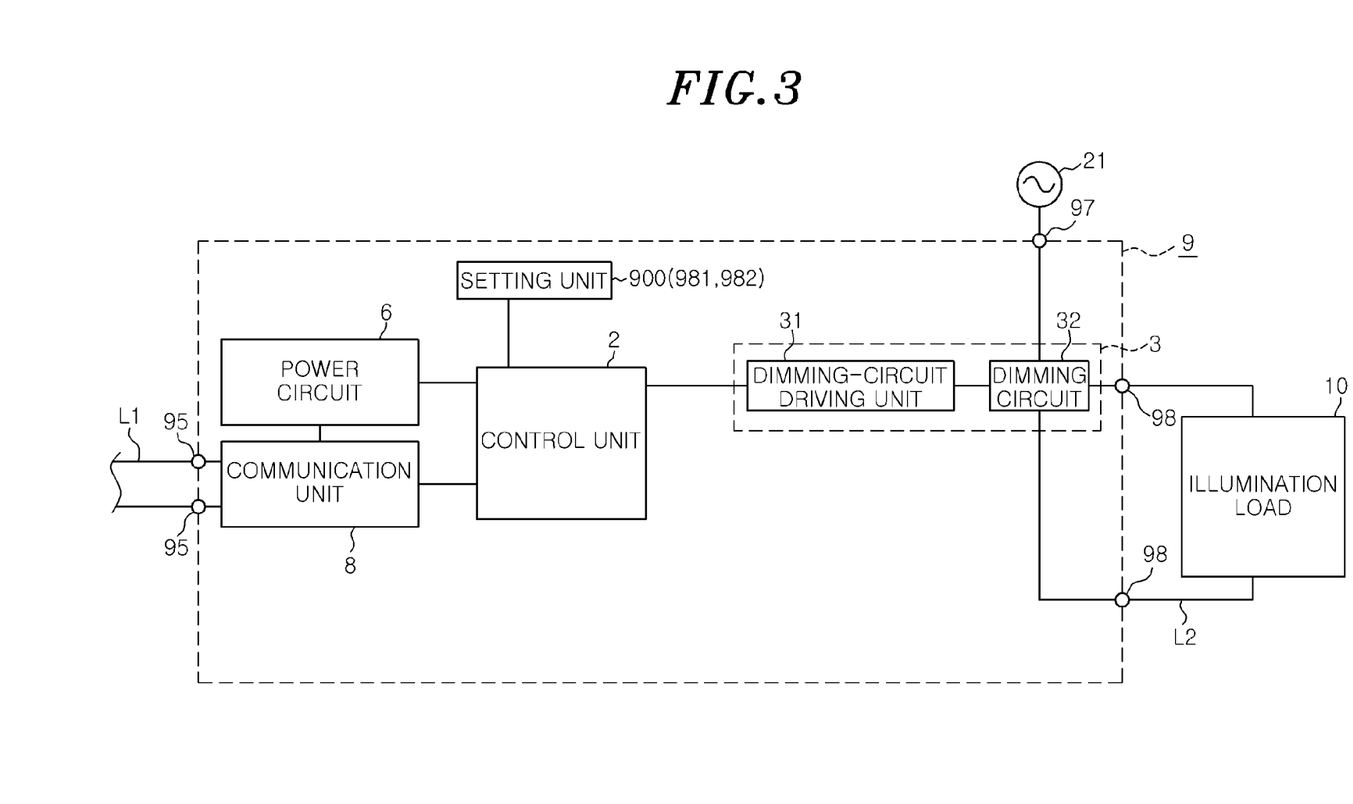
FIG. 3 is a schematic block diagram of the dimming device according to the embodiment of the present invention.

Next, the circuit configuration and operation of the dimming device 9 will be described with reference to FIG. 3.

The dimming device 9 includes a control unit 2, a dimming unit 3, a power circuit 6, a communication unit 8, and the setting unit 900. The dimming unit 3 includes a dimming-circuit driving unit 31 and a dimming circuit 32.

The power circuit 6 is operated by receiving operation power from a control signal transmitted through the communications line L1.

The dimming circuit 32 controls power supplied to the illumination load 10 and includes a semiconductor switch (e.g., a FET or a TRIAC) (not shown) that allows alternating current to flow bi-directionally.

The dimming-circuit driving unit 31 is connected to the dimming circuit 32 and controls the dimming circuit 32 to change the dimming level of the illumination load 10. The dimming-circuit driving unit 31 controls a timing for turning on/off the semiconductor switch (a conduction angle with respect to the frequency of power) to adjust power supplied to the illumination load 10, thereby dimming the illumination load 10. The dimming device 9 can turn on not only an LED illumination load controlled in the phase control scheme but also an illumination load such as an incandescent lamp.

The dimming device 9 of the present embodiment includes one dimming unit 3, but may include a plurality of dimming units. Further, the dimming unit 3 may be configured to dim a plurality of illumination loads.

The communication unit 8 communicates with the controller 11 through the communications line L1. Upon receiving a control signal sent from the controller 11, the communication unit 8 outputs information contained in the control signal to the control unit 2.

The control unit 2 includes a microcomputer (not shown) and the like. The control unit 2 is operated by reading out a program stored in a ROM (not shown) and executing the program. The control unit 2 performs a dimming control over the illumination load 10 by controlling the dimming unit 3 according to the control signal received by the communication unit 8.

In this regard, an operation of the control unit 2 to control the dimming level of the illumination load 10 by using the setting values set by the operation sections 981 and 982 will be described.

An LED luminaire has LED elements as a light source. The LED elements can be dimmed to low illuminance compared to fluorescent lamps. However, when the LED elements illuminate at low illuminance, unevenness in brightness or flickering becomes visible due to large deviation of lights emitted from the LED elements. In addition, when the LED elements illuminate at high illuminance, dazzling or glaring is likely to be perceived due to the light-emitting characteristic of LEDs. For these reasons, by rotating the operation section 981, the lower limit of the dimming range of the illumination load 10 is set to a dimming level at which unevenness in brightness of lights emitted from the LED elements is hardly visible (15% in the present embodiment). On the other hand, by rotating the operation section 982, the upper limit of the dimming range of the illumination load 10 is set to a dimming level at which glaring of the LED elements are hardly visible (75% in the present embodiment). Even if a user operates the operation device 12 such that the illumination load 10 is lighted at a dimming level out of the limited dimming level range (i.e., a dimming level below 15% or above 75%), the dimming device controls the illumination load 10 to be lighted at a dimming level between 15% and 75%. Consequently, unevenness in brightness of lights emitted from the respective LED elements is hardly be visible even if the illumination load 10 is dimmed to the lower limit of the dimming range, and dazzling or glaring of the LED elements is hardly visible even if the illumination load 10 is dimmed to the upper limit of the dimming range.

In the dimming device 9 of present embodiment, the lower limit of the dimming range is set to be 15% and the upper limit of the dimming range is set to be 75%. However, the numerical values for the lower and upper limits of the dimming range may be changed into appropriate values depending on differences in brightness of lights emitted from LED elements and/or depending on an environment where the illumination load 10 is installed.

As described above, the dimming device 9 of the present embodiment includes the control unit 2, the operation section 981 (the first setting section) and the operation section 982 (the second setting section). The control unit 2 receives a control signal transmitted by multiplexing transmission method and controls the dimming level of the illumination load 10 including LEDs. The operation section 981 (the first setting section) sets the lower limit of the dimming range of the illumination load 10. The lower limit can be adjusted within a first range. The operation section 982 (the second setting section) sets the upper limit of the dimming range of the illumination load 10. The upper limit can be adjusted within a second range. The minimum value in the second range is greater than the maximum value in the first range.

By setting the upper and lower limits of the dimming range of the illumination load 10, the control unit 2 suppresses unevenness in brightness at low illuminance and makes dazzling or glaring of LEDs at high illuminance less perceivable. In other words, the control unit 2 enables the illumination load 10 including LEDs to exhibit good visual quality throughout the entire range of dimming levels.

The illumination system according to the present embodiment includes the dimming device 9, the illumination load 10, the controller 11, and the operation device 12. The dimming device 9 is electrically connected to the communications line L1. The illumination load 10 includes LEDs and is controlled by the dimming device 9. The controller 11 is electrically connected to the communications line L1 and controls the dimming device 9 by using a control signal transmitted by multiplexing transmission method.

The operation device 12 is configured to allow a user to select a desired value for the dimming level of the illumination load 10 within a third range and transmit the selected desired value to the controller 11. The controller 11 generates a control signal based on the desired value and transmits the control signal to the dimming device 9. Herein, the minimum value in the third range is equal to or smaller than the minimum value in the first range, and the maximum value in the third range is equal to or larger than the maximum value in the second range.

If the desired value is smaller than the lower limit set by the operation section 981, the dimming device 9 sets the dimming level of the illumination load 10 to the set lower limit. If the desired value is larger than the upper limit set by the operation section 982, the dimming device 9 sets the dimming level of the illumination load 10 to the set upper limit.

By virtue of the dimming device 9, it is possible to implement the illumination system that can exhibit good visual quality throughout the entire range of dimming levels of the illumination load 10 having LEDs.

Figure 5:
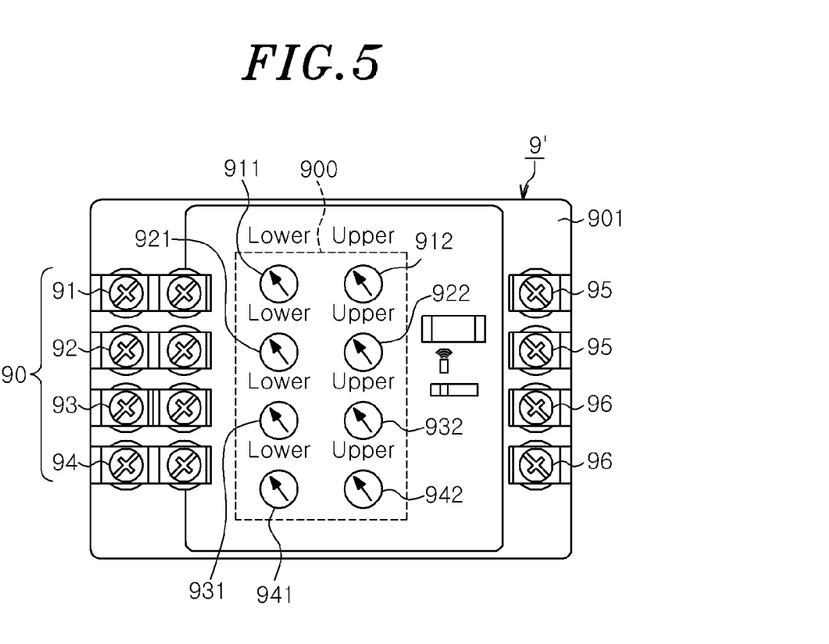
FIG. 5 is an external view of a dimming device according to a modification of the embodiment of the present invention.

Hereinafter, a modification of the illumination system of the present embodiment will be described with reference to FIG. 5.

A dimming device 9' of an illumination system according to the modification performs a control over an illumination load 10 in a signal-controlled manner. The illumination load 10 is configured to light LEDs at a dimming level indicated by a dimming signal sent from the dimming device 9'.

The dimming device 9' of the illumination system according to the modification is identical to the dimming device 9 according to the present embodiment except for that a dimming signal is outputted to the illumination load 10; and, therefore, the description on the same components and operations will be omitted.

The dimming device 9' of the modification performs dimming control over LED illumination loads (not shown) controlled in a signal-controlled manner. The signal-controlled manner for performing dimming control over the illumination load includes, e.g., a control manner using a control signal which is a PWM (pulse width modulation) signal, a control manner using a voltage level of a voltage signal of a DC voltage, and a control manner using a signal conforming to the DALI (digital addressable lighting interface) protocol defined in the standard for lighting control. In the following description, an example will be described in which the dimming device 9' outputs to the illumination load 10 a dimming signal represented as a voltage level of a DC voltage.

The dimming device 9' of the modification includes four dimming units 3 each outputting a dimming signal which is a voltage level indicating a dimming level.

In the main body 901 of the dimming device 9', a pair of multiplexed-transmission-signal terminals 95 to which the communications line L1 is connected, a pair of power terminals 96 to which the power source 21 is connected, dimming-signal terminal 90 for outputting a dimming signal to the illumination load 10, and a setting unit 900 are provided.

The dimming device 9' is operated with power supplied from the power source 21 (e.g., power source of 24 V AC).

The dimming signal terminal 90 includes four sets of dimming-signal terminals 91 to 94, and the sets of the dimming-signal terminals 91 to 94 are respectively connected to the dimming units 3. Each set of the dimming signal terminals 91 to 94 is connected to the illumination load 10 corresponding thereto. The dimming-signal terminal 90 includes four sets of the dimming-signal terminals in this modification, but may include one or more sets of dimming-signal terminals.

The setting unit 900 includes operation sections 911, 921, 931 and 941 (first setting sections) to set a lower limit of a dimming range, for each of four illumination loads 10. In addition, the setting unit 900 includes operation sections 912, 922, 932 and 942 (second setting sections) to set an upper limit of a dimming range, for each of the four illumination loads 10.

Although the setting unit 900 according to this modification has four sets of operation sections (eight operation sections), the number of the set of operation sections is not limited to four and may be determined appropriately depending on the number of the dimming units 3. In addition, the setting unit 900 is not limited to have the operation sections, but may employ any one of DIP switches, slide switches, input devices of a touch panel type, and wireless communication devices using infrared communication or radio wave, as long as the upper and lower limits of the dimming range can be set.

The control unit 2 of the dimming device 9' outputs a DC voltage (e.g., 0 V to 10 V) to the illumination load 10 through the dimming unit 3 in response to a control signal received from the controller 11.

Figure 6:
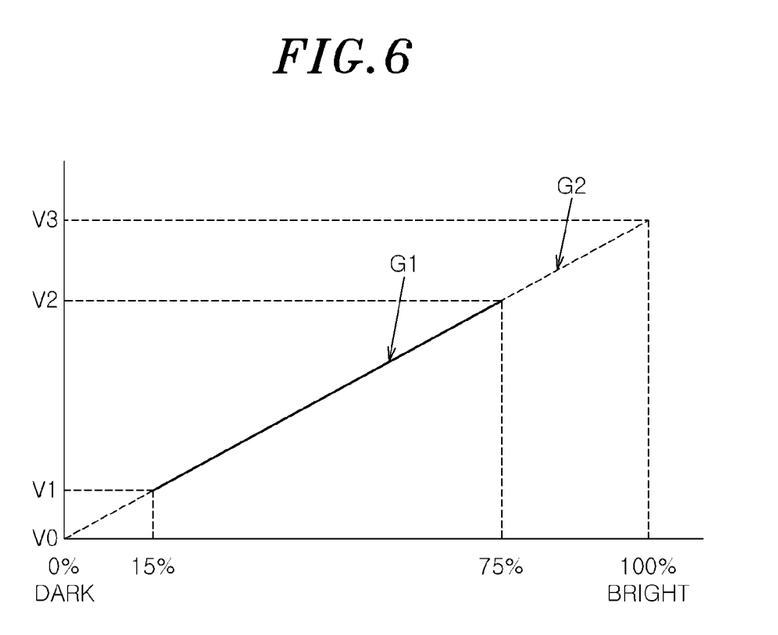
FIG. 6 is a graph for illustrating a dimming range of a dimming device according to the modification of the embodiment of the present invention.

Graph G2 indicated by a dashed line in FIG. 6 represents the range of dimming levels which can be dimmed by the dimming device 9'. Upon receiving a control signal through the communications line L1, the dimming device 9' changes the dimming level of the illumination load 10 (on the horizontal axis of FIG. 6) depending on the voltage level of the control signal (on the vertical axis of FIG. 6). The dimming device 9' substantially turns off the illumination load 10 if the voltage level of the control signal is V0 (e.g., 0 V) and turns on the illumination load 10 at its full intensity if the voltage level of the control signal is V3 (e.g., 10 V).

For the dimming device 9' according to the modification, the lower limit of the dimming range of the illumination load 10 is set to be 15% of its full intensity by rotating the operation section, and the upper limit of the dimming range of the illumination load 10 is set to be 75% of its full intensity by rotating the operation section. The illumination load 10 is lighted at a dimming level between 15% and 75% (see graph G1).

Even if a user operates the operation device 12 such that the illumination load 10 is dimmed out of the limited dimming level range (i.e., below 15% or above 75%), the dimming device 9' limits the range of the voltage outputted to the dimming signal terminal 90 to a voltage level between V1 and V2. Consequently, the dimming device 9' dims the illumination load 10 to a dimming level between 15% and 75%. That is, by virtue of the dimming device 9', unevenness in brightness of lights emitted from the LED elements is hardly visible even at the lower limit of the dimming range, and dazzling or glaring of the LED elements is hardly visible even at the upper limit of the dimming range.

In the dimming device 9' of the illumination system according to the modification, the lower limit of the dimming range is set to be 15% and the upper limit of the dimming range is set to be 75%. However, the numerical values for the lower and upper limits of the dimming range may be changed into appropriate values depending on differences in brightness of lights emitted from the illumination load 10 and/or depending on an environment where the illumination load 10 is installed.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A dimming device, comprising:
   a controller configured to receive a control signal transmitted by a multiplexing transmission method and to control a dimming level of an illumination load in response to the control signal, the illumination load including light-emitting diodes;
   a first manually operable setter configured to adjust a lower limit of the dimming level of the illumination load within a first range by a manual operation; and
   a second manually operable setter configured to adjust an upper limit of the dimming level of the illumination load within a second range by a manual operation,
   wherein a minimum value in the second range is greater than a maximum value in the first range, and the first setter and the second setter are electrically connected to the controller.

2. An illumination system, comprising:
   a dimming device electrically connected to a communication line;
   an illumination load controlled by the dimming device, the illumination load including light-emitting diodes; and
   a controller electrically connected to the communication line, the controller being configured to control the dimming device by transmitting a control signal to the dimming device in a multiplexing transmission method,
   wherein the dimming device includes:
   a dimming controller configured to receive the control signal transmitted by the multiplexing transmission method and to control a dimming level of the illumination load in response to the control signal;
   a first manually operable setter configured to adjust a lower limit of the dimming level of the illumination load within a first range by a manual operation; and
   a second manually operable setter configured to adjust an upper limit of the dimming level of the illumination load within a second range by a manual operation,
   wherein a minimum value in the second range is greater than a maximum value in the first range, and the first setter and the second setter are electrically connected to the dimming controller.

3. The illumination system of claim 2, further comprising:
   an operation device configured to allow a user to select a desired value for the dimming level of the illumination load within a third range and transmit the selected desired value to the controller, wherein the control signal is generated based on the selected desired value.

4. The illumination system of claim 3, wherein a minimum value in the third range is equal to or smaller than a minimum value in the first range, and a maximum value in the third range is equal to or larger than a maximum value in the second range.

5. The illumination system of claim 3, wherein when the desired value is smaller than the lower limit adjust by the first setter, the dimming device sets the dimming level of the illumination load to the lower limit, and when the desired value is larger than the upper limit adjusted by the second setter, the dimming device sets the dimming level of the illumination load to the upper limit.

* * * * *